July 26, 1966
C. A. COOK
3,262,572
SEPARATOR-FILTER
Filed May 27, 1963
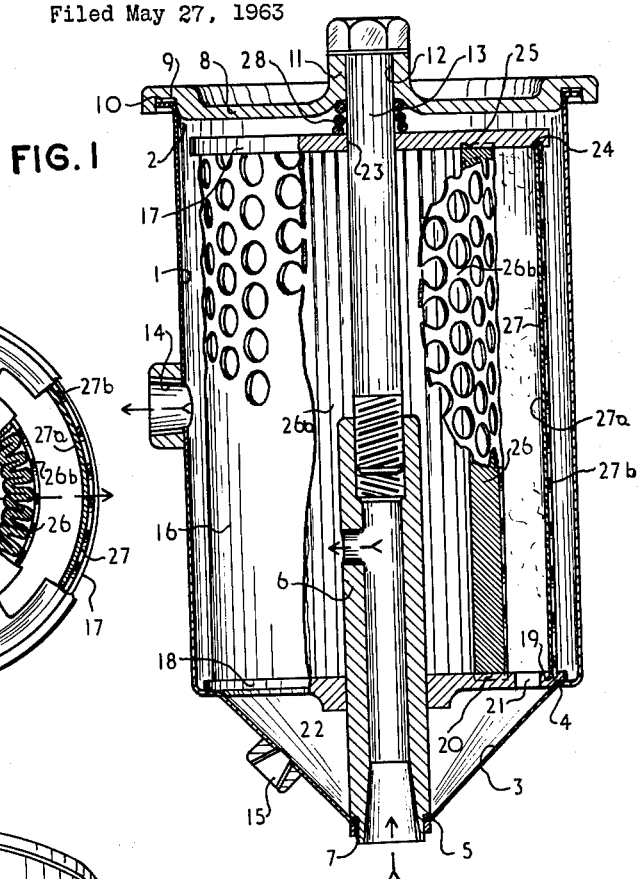
FIG. 1
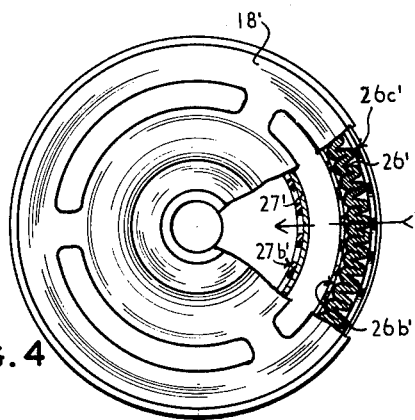
FIG. 3
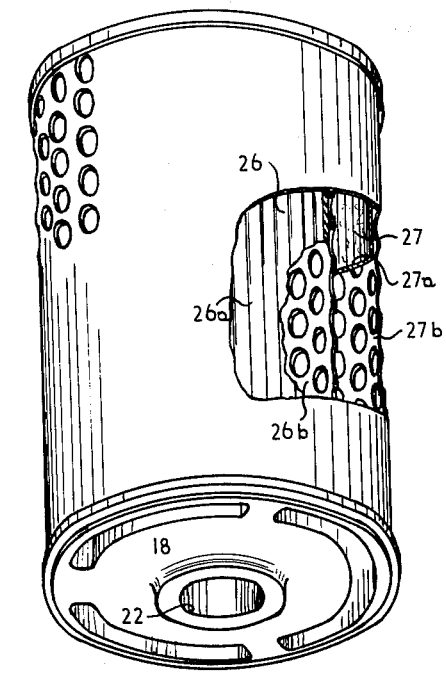
FIG. 2
FIG. 4
INVENTOR
CLAYTON A. COOK
ATTORNEY United States Patent Office 3,262,572
Patented July 26, 1966

1

3,262,572
SEPARATOR-FILTER
Clayton A. Cook, Islington, Ontario, Canada, assignor to Purolator Products, Inc., Rahway, N.J., a corporation of Delaware
Filed May 27, 1963, Ser. No. 283,209
3 Claims. (Cl. 210—307)

This invention relates to improvements in a separator-filter, i.e. a filter designed to remove both water and solid particles from liquids such as gasoline, kerosene, jet and diesel fuels.

When liquids occur in the form of emulsions, water may be present in such very fine particles that its removal requires the successive steps of first demulsifying the liquid mixture by coalescing the moisture particles and then separating the water droplets from the principal liquid.

It is an object of the present invention to provide a separator-filter unit, such as one suitable for in-line installation, that utilizes a novel arrangement of media to remove solid particles, coalesce the water, and separate the coalesced water from the fuel or other principal liquid.

A further object of the invention is to provide a separator-filter unit of the character described wherein the separated water is inescapably trapped; clear of the clean, water-free outgoing stream of liquid.

A further object of the invention is to provide a separator-filter unit for in-line installation having a cleaning and de-watering cartridge with two media in spaced relation that divides the filter into three compartments between the inlet and outlet, containing respectively contaminated liquid, separated water and primary liquid, and clean dry liquid respectively, with only the intermediate or water fall-out compartment having communication with the water collecting sump chamber.

A further object of the invention is to provide a novel separator filter unit for in-line installation having a primary filter medium to remove solid particles and coalesce the moisture and a secondary medium to separate the coalesced water from the principal liquid, the two media being in spaced relation and serving to divide the separator filter unit into three compartments with only the intermediate one having communication with the water collecting sump, whereby the separated water is denied any contact with the outgoing water-free liquid after it has passed through the second filter medium, thereby eliminating any possibility of the clean, water-free liquid being recontaminated with the separated water.

A further object of the invention is to provide an in-line type separator of the character described in which a single cavity container houses a replaceable cartridge that seals off the lower part of the container as a sump and further divides the main body of the container into three compartments through which the liquid flow passes in succession, with the intermediate compartment only having communication with the divided off sump.

A further object of the invention is to provide a novel separator-filter unit for in-line installation having spaced inlet and outlet ports, such as a radial port in a side wall and an axial port in top or bottom of a cylindrical container, with the direction of the through flow being optional, subject to the filter media of the cartridge being properly co-related.

A further object of the invention is the provision of a separator filter unit with a filter cartridge that provides its own seals as required between inlet and outlet compartments and also between both inlet and outlet compartments and the water collecting sump.

To the accomplishment of these and related objects as shall become apparent as the description proceeds, the invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure wherein like characters indicate like parts throughout the several views.

In the drawings:

FIGURE 1 is a vertical section of a separator-filter constructed in accordance with the present invention and arranged for in-line installation with the inlet in the bottom and the outlet in the side wall;

FIGURE 2 is a perspective view of the replaceable cartridge, with parts thereof broken away;

FIGURE 3 is a sectional-bottom plan view of the cartridge shown in FIGURES 1 and 2; and FIGURE 4 is a similar sectional-bottom plan view of a cartridge useable in the same unit as shown in FIGURE 1, when the liquid flow direction is reversed, i.e. with the inlet in the side wall and the outlet in the bottom.

Though capable of many uses, this separator-filter is especially valuable in removing solid particle and moisture contaminants from gasoline, kerosene, jet and diesel fuels and because of its novel structure enjoys a unique versatility that allows its in-line installation for liquid flow in either direction, simply by inserting the proper "in-flow" cartridge.

Referring to the drawings, the reference character 1 indicates a case or container, here shown as of cylindrical form with an open top 2 and a tapered or conical bottom 3, the cylindrical body having an inwardly directed step or offset shoulder 4 at its junction with the tapered bottom 3.

There is an axial inlet opening 5 at the apex of the tapered or conical bottom 3 and set in this opening is a tube or spigot 6 with a lateral orifice near its upper end that rises to approximately midway of the height of the container 1, being suitably secured in the opening 5, as by a threaded nut, ring or the like 7.

A removable cover 8 has a circumferential trough 9 near the perimeter on its underside to accommodate a gasket 10 and receive the upper rim of the case or container 1. Through an elevated boss 11 at the center, an opening 12 extends to pass a head or cover bolt 13 whose lower end is threaded into the upper end of the spigot 6.

There is an outlet 14 in the case's side wall, designed to receive a conduit fitting (not shown) as is also the lower end of the spigot 6. The conical bottom 3 has a drain port 15 normally closed by a suitable cock or this conical bottom 3 may be connected to an auxiliary sump if greater water storage capacity is needed.

A unitary filter cartridge 16, that is easily replaceable through the removable cover 8, is mounted in the case or container 1. The cartridge 16 is cylindrical having annular upper and lower end caps 17 and 18. On its upper side, the lower end cap 18 has a narrow shallow circumferential trough 19 near its periphery and spaced inwardly therefrom a wide shallow trough 20. Between the troughs 19 and 20 the cap 18 is cut through with a ring of arcuate orifices 21 and is also provided with an axial aperture 22 to tightly embrace the spigot 6 in sealing relation.

The upper end cap 17 has a smaller axial aperture 23 to similarily embrace the cover bolt 13 in tight sealing relation and on its underside has a narrow shallow trough 24 near its periphery and a wider shallow trough 25 spaced inwardly therefrom, said troughs 24 and 25 confronting and registering with the corresponding troughs 19 and 20 on the upper side of the bottom end cap 18.

Opposite ends of a cylinder 26 of primary filter medium nest in the wide confronting troughs 20 and 25 and opposite ends of a cylinder 27 of secondary or stripping filter medium nest in the confronting end cap troughs 19 and 24. The primary filter medium 26 is a pleated or convoluted paper element 26a surrounded by a perforated retaining body 26b the purpose of which medium is to remove solid particles and coalesce the moisture into droplets. The secondary or stripping filter medium 27 is a fine water stripping element 27a surrounded by an outer perforated retaining cylinder 27b. In actual manufacture, the cartridge 16 will preferably be constructed with the concentric media 26 and 27 and their respective retaining bodies cemented, bonded or otherwise united with or embedded in the end caps 17 and 18 to form a unitary item having durable and leak-proof connections.

In position, in the case 1, the cartridge 16 is disposed concentrically within the container with its lower end cap 18 resting on the step or shoulder 4 and being pressed into tight sealing engagement therewith by a coil spring 28 that encircles the cover bolt 13 and is compressed between the underside of the cover 8 and the upper side of the cartridge's upper end cap 17.

In use, the filter is installed in the fuel feed line with the input conduit connected to the mouth of the spigot 6 and the output conduit connected to the outlet port 14. As contaminated fuel containing both moisture and solid particles flows through the inlet spigot and out its lateral orifice into the central or first chamber from which it passes through the primary filter medium of pleated or convoluted paper that removes the solid particles and coalesces the moisture into water droplets and enters the second or intermediate chamber as filtered fuel with coalesced or water droplets thence it flows through the secondary filter medium into the third or outer chamber between the perimeter of the cartridge and the wall of the case. However, the secondary or stripping filter medium will not pass the water droplets but only the clean and water-free fuel which passes out of the unit through the side wall outlet; the water stopped in the second or intermediate chamber by the secondary or stripping medium flows down the inner wall thereof and through the ring of arcuate orifices in the lower end cap into the water sump provided by the conical base of the container and the lower end cap of the cartridge. Water entering the sump displaces a fuel and water mixture until the sump is substantially filled principally with water or with water only when it should be drained. It will be particularly noted that no separated water can come into contact with or recontaminate fuel that has passed through the secondary or stripping filtering medium as the separated water in the intermediate chamber has access to the sump which is sealed off from access to either the first or third chambers containing the original contaminated fuel and the clean water-free product respectively.

Where an installation calls for a reverse direction flow, the case or container 1 remains unchanged, except that its port 14 receives the liquid line's input conduit and the output conduit connects with the port 5. The general form of the in-flow or down-flow cartridge 16' shown in FIGURE 4, remains the same with end caps 17' and 18' and primary and secondary media 26' and 27', only that these media are arranged in reversed positions i.e., the primary medium 26' becomes the outer annulus and the secondary or stripper medium 27' becomes the inner annulus. Furthermore, because the flow is toward the center, the perforated retaining cylinders 26b' and 27b' are transposed to the inside of their respective elements, as is clearly seen in the drawing, and finally, an additional perforated outer wrap 26c' surrounds the outer annulus. As regards this so-called in-flow cartridge 16' it will be noted that the locating of the primary medium 26' as the outer annulus with a much larger circumference affords a greatly increased area for solid contaminant holding capacity thus giving the same a longer useful life.

While this disclosure is not directed to the specific primary and stripping filter media employed in the present in-line separator-filter other than to designate the primary filter mdeium 26 as a pleated paper annulus to remove solid particles and coalesce the moisture into small droplets and the secondary filter medium 27 as a water stripping ring, nevertheless a primary coalescing medium of phenol resin bonded paper with long bark fibres, cotton linters and short glass fibres in an accordion pleated annulus and a secondary stripping medium of a resin and silicone treated paper in the form of a cylinder have been found satisfactory but I do not wish to limit this separator-filter to the use of any specific media for the removal of solids and coalescing the moisture and the subsequent stripping of the water droplets respectively.

This explanation will convey the broad concept of the invention of providing a simple and highly efficient in-line separator-filter embodying a single chamber case designed to house an integral replaceable cartridge, wherein the cartridge (a) seals off a part of the chamber as a water receiving sump, (b) divides the main part of the casing chamber into three compartments, (c) affords communication between the intermediate compartment and the sump, and (d) positively bars all communication between the first and third compartments with the sump. Though it may appear possible under ideal conditions of temperature control and quietude to maintain a division between stripped water and clean water-free fuel by gravity alone, it is not practical where vibration and bouncing movements are encountered with resulting agitation or where a rise in fuel temperature increases water reabsorption. Only the positive sealing off of the sump from the clean, water-free fuel in the third compartment can assure that no recontamination will occur.

As already pointed out, this separator-filter unit comprising a one-chamber case with an integral replaceable cartridge is a versatile in-line unit allowing of installation for liquid flow in either direction, but it should be also noted that wide latitude is afforded in the location of the inlet and outlet ports; for instance, either one may be through either the top or bottom of the casing and the other can be at any desired level in the side wall, above the sump—or indeed either port may be in any chosen location providing that one communicates with the core of the filter and the other with the perimeter thereof.

From the foregoing description taken in connection with the accompanying drawings, it will be manifest that a separator-filter is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

What is claimed as new is:

1. A separator-filter for liquids comprising a one-chamber casing having an interior projection near its lower end, a drain opening therebelow, an inlet and an outlet; and a replaceable filter cartridge housed therein that makes liquid tight engagement with said interior projection and seals off the lower part of the casing chamber as a sump and divides the main portion of the chamber into three compartments that communicate respectively with said inlet, sealed off sump and outlet, said cartridge having spaced annular upper and lower end caps and a pair of annular filters in spaced concentric relation secured therebetween in leak-proof relation that serve to divide the compartments, one of which lies within the inner annulus, a second between the two annuli and the other between the outer annulus and the casing.

2. The structure according to claim 1 in which the lower end cap of the filter cartridge has an orifice therein providing communication between the intermediate compartment and the sump and wherein the casing inlet and outlet may communicate with either of the other compartments.

3. A separator-filter for removing solid particles and water contaminants from a liquid comprising a container with an inlet, an outlet and an open top; a cover for said open top; an integral cartridge replaceably mounted in said container, said cartridge having spaced annular upper and lower end caps with concentric troughs on their confronting faces and concentrically spaced primary and secondary filtering media nesting in said troughs and secured to said end caps in leak-proof relation and dividing said container into three compartments, namely a contaminated liquid area between the inlet and the primary filter medium, a liquid with coalesced water area between the said media, and a clean water-free liquid area between the secondary filter medium and the outlet; the lower cap of said cartridge also sealing off a part of said container as a water sump and having an orifice therein providing communication between the intermediate compartment, i.e., the liquid and coalesced water area only and the sump, and means for draining said sump.

References Cited by the Examiner
UNITED STATES PATENTS

| | | | |
|---|---|---|---|
| 2,298,674 | 10/1942 | Burhans | 210—451 |
| 2,507,125 | 5/1950 | Townsend | 210—314 X |
| 2,864,505 | 12/1958 | Kasten | 210—315 |
| 3,019,904 | 2/1962 | Stecher | 210—232 X |
| 3,187,895 | 6/1965 | Pall et al. | 210—114 |
| 3,228,527 | 1/1966 | McPherson | 210—307 |

REUBEN FRIEDMAN, *Primary Examiner.*

F. A. SPEAR, *Assistant Examiner.*